(12) United States Patent
Abe et al.

(10) Patent No.: US 11,073,732 B2
(45) Date of Patent: Jul. 27, 2021

(54) DISPLAY DEVICE

(71) Applicant: Japan Display Inc., Tokyo (JP)

(72) Inventors: Hiroyuki Abe, Tokyo (JP); Kazune Matsumura, Tokyo (JP); Gen Koide, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 16/703,895

(22) Filed: Dec. 5, 2019

(65) Prior Publication Data

US 2020/0192170 A1 Jun. 18, 2020

(30) Foreign Application Priority Data

Dec. 18, 2018 (JP) .................. 2018-236407

(51) Int. Cl.
*G02F 1/1362* (2006.01)
*G09G 3/36* (2006.01)
*G02F 1/1339* (2006.01)
*G02F 1/133* (2006.01)

(52) U.S. Cl.
CPC ...... *G02F 1/136286* (2013.01); *G02F 1/1339* (2013.01); *G02F 1/13306* (2013.01); *G09G 3/3677* (2013.01); *G09G 2310/0286* (2013.01)

(58) Field of Classification Search
CPC .............................................. G02F 1/136286
See application file for complete search history.

(56) References Cited

U.S. PATENT DOCUMENTS

| 2004/0012744 A1* | 1/2004 | Ishige .................. G02F 1/1345 349/139 |
| 2008/0024407 A1* | 1/2008 | Yamaguchi ......... G02F 1/13452 345/87 |
| 2015/0346556 A1* | 12/2015 | Hirota ................... G02F 1/1339 349/43 |
| 2018/0231853 A1 | 8/2018 | Yamamoto et al. |
| 2019/0155112 A1* | 5/2019 | Cao ................... G02F 1/136259 |

FOREIGN PATENT DOCUMENTS

| JP | 2015-225227 A | 12/2015 |
| JP | 2018-132606 A | 8/2018 |

* cited by examiner

*Primary Examiner* — Sang V Nguyen
(74) *Attorney, Agent, or Firm* — Xensus LLP

(57) ABSTRACT

According to one embodiment, a display device includes a display portion, a non-display portion around the display portion, a scanning line located in the display portion, a feed line at a common potential located in the non-display portion, a scanning line drive circuit located in the non-display portion and supplying a scanning signal to the scanning line, a first wiring line group located between the feed line and the scanning line drive circuit and connected to the scanning line drive circuit, and a transparent conductive film electrically connected to the feed line and covering the feed line, the first wiring line group and the scanning line drive circuit. The transparent conductive film has an opening overlapping the first wiring line group.

16 Claims, 8 Drawing Sheets

DISPLAY DEVICE

CROSS-REFERENCE TO RELATED APPLICATIONS

This application is based upon and claims the benefit of priority from Japanese Patent Application No. 2018-236407, filed Dec. 18, 2018, the entire contents of which are incorporated herein by reference.

FIELD

Embodiments described herein relate generally to a display device.

BACKGROUND

Recently, in display devices, various technologies for suppressing reduction in reliability have been considered. In one example, from the perspective of securing desired adhesive strength, the following technology has been disclosed. That is, a transparent conductive film is provided between an alignment film which is in contact with a sealant and an inorganic insulating film which serves as a base for the alignment film.

In another example, in a liquid crystal display device comprising a touch sensor, from the perspective of suppressing noise caused by a high-frequency pulse for touch sensing, the following technology has been disclosed. That is, a mesh-patterned shield formed of a metal material is provided on sensor feed lines.

DETAILED DESCRIPTION

Figure 1:
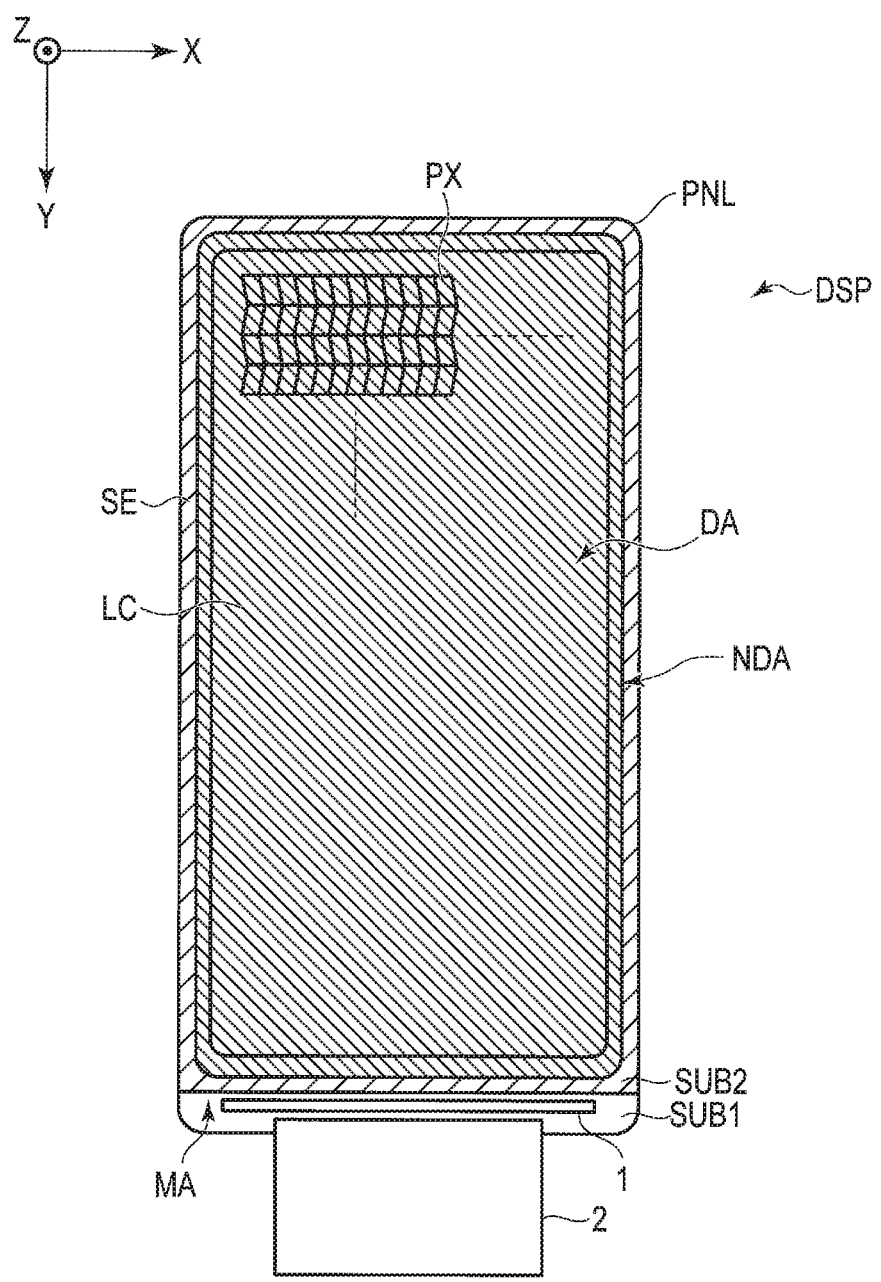
FIG. 1 is a plan view showing a configuration example of a display device DSP of the present embodiment.

In general, according to one embodiment, a display device includes a display portion in which a plurality of pixels are arranged in a matrix in a first direction and a second direction, a non-display portion around the display portion, a scanning line located in the display portion and extending in the first direction, a feed line at a common potential located in the non-display portion and extending in the second direction, a scanning line drive circuit located in the non-display portion and supplying a scanning signal to the scanning line, a first wiring line group located between the feed line and the scanning line drive circuit and connected to the scanning line drive circuit, and a transparent conductive film electrically connected to the feed line and covering the feed line, the first wiring line group and the scanning line drive circuit. The transparent conductive film has an opening overlapping the first wiring line group.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the present embodiment, a liquid crystal display device will be described as an example of a display device DSP. Note that the main configurations disclosed in the present embodiment are also applicable to self-luminous display devices including organic electroluminescent display elements, μLEDs, etc., electronic paper type display devices including electrophoretic elements, display devices employing micro-electromechanical systems (MEMS), and display devices employing electrochromism.

FIG. 1 is a plan view showing a configuration example of the display device DSP of the present embodiment. In one example, a first direction X, a second direction Y and a third direction Z are orthogonal to one another but may cross one another at an angle other than 90 degrees. The first direction X and the second direction Y correspond to directions parallel to the surface of a substrate constituting the display device DSP, and the third direction Z corresponds to the thickness direction of the display device DSP.

The display device DSP includes a display panel PNL, an IC chip 1 and a flexible printed circuit 2. The display panel PNL includes a display portion DA in which an image is displayed, and a frame-shaped non-display portion NDA which surrounds the display portion DA. The display portion DA includes a plurality of pixels PX arranged in a matrix in the first direction (row direction) X and the second direction (column direction) Y.

The display panel PNL is, for example, a liquid crystal display panel, and includes a first substrate SUB1, a second substrate SUB2, a liquid crystal layer LC and a sealant SE. The second substrate SUB2 faces the first substrate SUB1. The sealant SE is located in the non-display portion NDA, and bonds the first substrate SUB1 and the second substrate SUB2 together and seals in the liquid crystal layer LC. The first substrate SUB1 includes a mounting portion MA which extends more in the second direction Y than the second substrate SUB2 does.

The IC chip 1 and the flexible printed circuit 2 are mounted on the mounting portion MA. Note that the IC chip 1 may be mounted on the flexible printed circuit 2.

Figure 2:
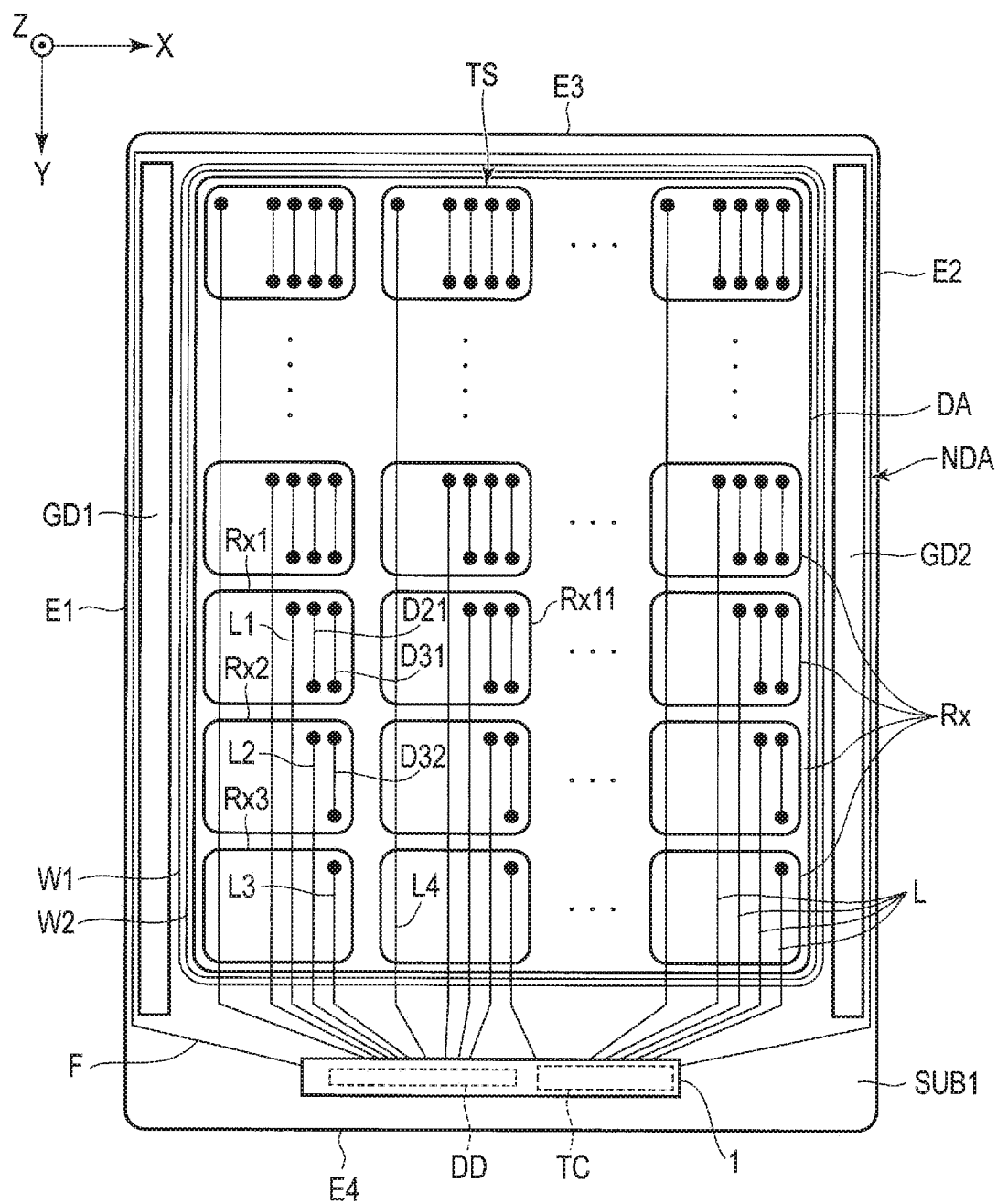
FIG. 2 is a plan view showing a configuration example of a first substrate SUB1 shown in FIG. 1.

FIG. 2 is a plan view showing a configuration example of the first substrate SUB1 shown in FIG. 1. The first substrate SUB1 includes the above-described display portion DA and non-display portion NDA. The first substrate SUB1 has substrate end portions E1 to E4. The substrate end portions E1 and E2 extend in the second direction Y and correspond to, for example, long sides. The substrate end portions E3 and E4 extend in the first direction X and correspond to, for example, short sides.

The first substrate SUB1 includes a touch sensor TS in the display portion DA and includes the IC chip 1 in the non-display portion NDA.

A display driver DD and a touch controller TC are incorporated in the IC chip 1. The display driver DD outputs a signal necessary for image display such as a video signal to the display panel PNL in an image display mode of displaying an image. The touch controller TC controls the touch sensor TS in a touch sensing mode of detecting approach of an object to or contact of an object with the display device DSP. Note that the touch controller TC may be incorporated in an IC chip other than the display driver DD.

Although the touch sensor TS will be described as a self-capacitance type touch sensor, the touch sensor TS may be a mutual capacitance type touch sensor. The touch sensor TS includes a plurality of sensor electrodes Rx and a plurality of sensor lines L. The sensor electrodes Rx are located in the display portion DA and are arranged in a matrix in the first direction X and the second direction Y. In the display portion DA, the sensor lines L extend in the second direction Y and are arranged in the first direction X. Each sensor line L is provided at, for example, a position overlapping a signal line S which will be described later. In addition, each sensor line L is drawn to the non-display portion NDA, is electrically connected to the IC chip 1, and is electrically connected to the touch controller TC inside the IC chip 1.

Here, attention will be focused on the relationship between sensor lines L1 to L3 arranged in the first direction X and sensor electrodes Rx1 to Rx3 arranged in the second direction Y. The sensor line L1 overlaps the sensor electrodes Rx1 to Rx3 and is electrically connected to the sensor electrode Rx1.

The sensor line L2 overlaps the sensor electrodes Rx2 and Rx3 and is electrically connected to the sensor electrode Rx2. A dummy line D21 is spaced apart from the sensor line L2. The dummy line D21 overlaps the sensor electrode Rx1 and is electrically connected to the sensor electrode Rx1. The sensor line L2 and the dummy line D21 are located on the same signal line as will be described later.

The sensor line L3 overlaps the sensor electrode Rx3 and is electrically connected to the sensor electrode Rx3. A dummy line D31 overlaps the sensor electrode Rx1 and is electrically connected to the sensor electrode Rx1. A dummy line D32 is spaced apart from the dummy line D31 and the sensor line L3. The dummy line D32 overlaps the sensor electrode Rx2 and is electrically connected to the sensor electrode Rx2. The sensor line L3 and the dummy lines D31 and D32 are located on the same signal line.

In the touch sensing mode, the touch controller TC applies a sensor drive voltage to the sensor lines L. Consequently, the sensor drive voltage is applied to the sensor electrodes Rx, and touch sensing in the sensor electrodes Rx is performed. Sensor signals corresponding to the results of sensing in the sensor electrodes Rx are output to the touch controller TC via the sensor lines L. Based on the sensor signals, the touch controller TC or an external host detects the presence or absence of approach of an object to or contact of an object with the display device DSP and the position coordinates of the object.

In the image display mode, a common voltage (Vcom) different from the sensor drive voltage is applied to the sensor electrodes Rx. The common voltage is applied from, for example, a voltage supply portion included in the display driver DD via the sensor lines L.

The first substrate SUB1 includes scanning line drive circuits GD1 and GD2, a feed line F, and wiring lines W1 and W2 in the non-display portion NDA. The scanning line drive circuit GD1 is provided between the substrate end portion E1 and the display portion DA. The scanning line drive circuit GD2 is provided between the substrate end portion E2 and the display portion DA.

The feed line F is provided along the substrate end portions E1 to E3. In the example illustrated, the feed line F is provided between the substrate end portion E1 and the scanning line drive circuit GD1, and is provided between the substrate end portion E2 and the scanning line drive circuit GD2. The feed line F is electrically connected to, for example, the IC chip 1, and the IC chip 1 supplies the common voltage to the feed line F. Furthermore, the common voltage supplied to the feed line F in the image display mode and the common voltage supplied to the feed line F in the touch sensing mode may have the same potential or may have different potentials.

Each of the wiring lines W1 and W2 is in the form of a frame surrounding the display portion DA. The wiring line W1 is provided between the feed line F and the wiring line W2. The wiring line W2 is provided between the wiring line W1 and the display portion DA. The potential of the wiring line W1 is different from the potential of the feed line F and the wiring line W2 and is, for example, a fixed potential. In addition, the potential of the wiring line W2 is the same as the potential of the feed line F. The potential of the wiring line W1 may be relatively lower or may be relatively higher than the potential of the wiring line W2. If the potential of the wiring line W1 is lower than the potential of the wiring line W2, the wiring line W1 functions as an ion trap line which traps impurity ions having positive polarity. Alternatively, if the potential of the wiring line W1 is higher than the potential of the wiring line W2, the wiring line W1 functions an ion trap line which traps impurity ions having negative polarity. In one example, the potential of the wiring line W2 is the same as the potential of a low-potential power supply VGL.

Figure 3:
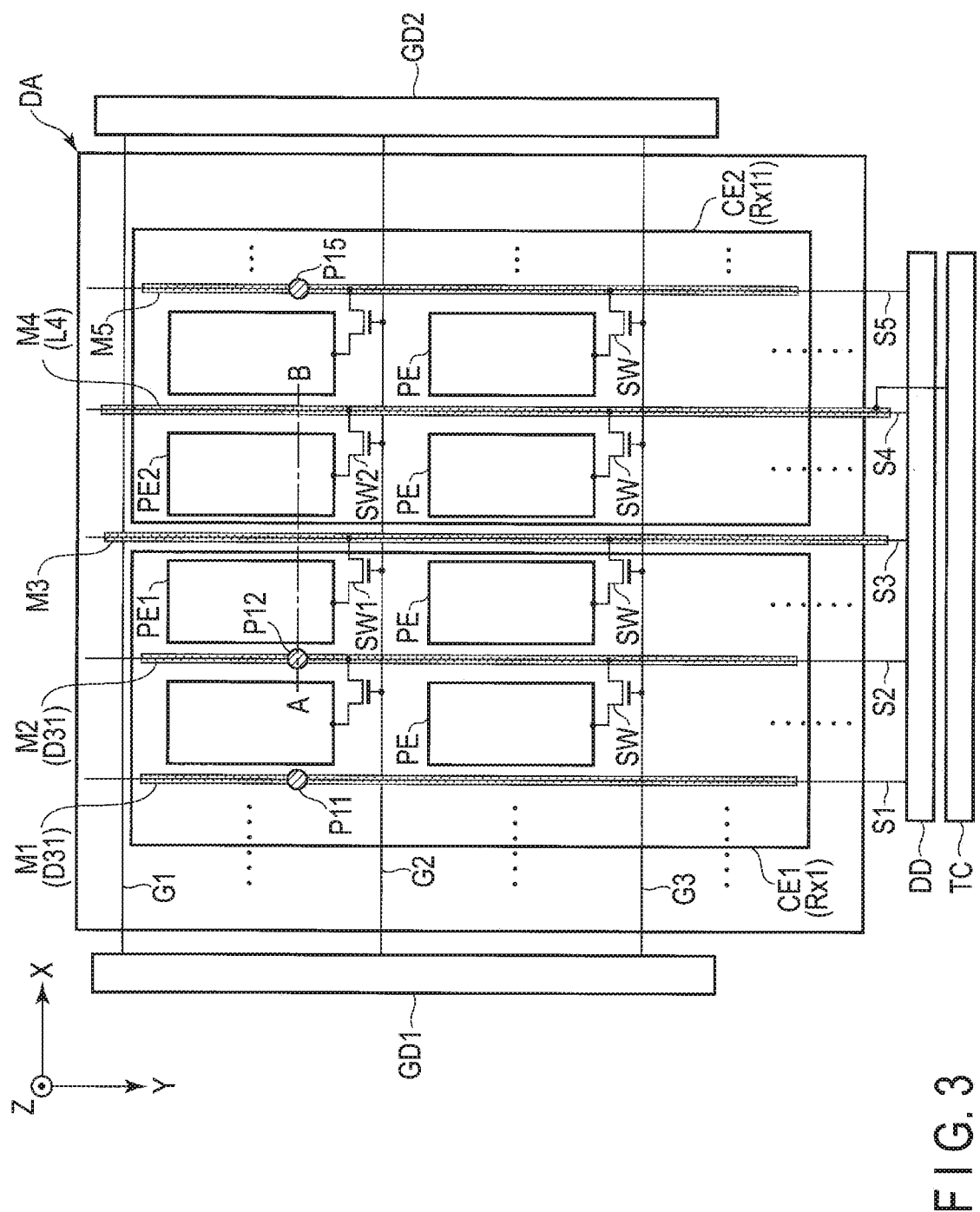
FIG. 3 is an enlarged plan view of a region including sensor electrodes Rx1 and Rx11 shown in FIG. 2.

FIG. 3 is an enlarged plan view of a region including sensor electrodes Rx1 and Rx11 shown in FIG. 2. Scanning lines G1 to G3 extend in the first direction X, and are arranged and spaced apart from one another in the second direction Y. The scanning lines G1 to G3 are electrically connected to the scanning line drive circuits GD1 and GD2. Signal lines S1 to S5 extend in the second direction Y, and are arranged and spaced apart from one another in the first direction X. The signal lines S1 to S5 are electrically connected to the display driver DD. Note that the signal lines S1 to S5 are still assumed to extend in the second direction Y even if parts of the signal lines S1 to S5 are bent.

Common electrodes CE1 and CE2 are arranged and spaced apart from each other in the first direction X. The common electrode CE1 corresponds to the sensor electrode Rx1 shown in FIG. 2, and the common electrode CE2 corresponds to the sensor electrode Rx11 shown in FIG. 2.

A plurality of pixel electrodes PE overlap each of the common electrodes CE1 and CE2. Each pixel electrode PE is electrically connected to one of the signal lines S1 to S5 via a switching element SW. For example, a switching element SW1 shown in the drawing is electrically connected to the scanning line G2 and the signal line S3. A pixel electrode PE1 overlaps the common electrode CE1 and is electrically connected to the signal line S3 via the switching element SW1. In addition, a pixel electrode PE2 overlaps the common electrode CE2 and is electrically connected to the signal line S4 via a switching element SW2.

Metal lines M1 to M5 extend in the second direction Y and are arranged in the first direction X. The metal lines M1 to M5 overlap the signal lines S1 to S5, respectively. For example, the metal lines M1 and M2 correspond to the dummy line D31 shown in FIG. 2, and the metal line M4 corresponds to the sensor line L4 shown in FIG. 2.

The common electrode CE1 overlaps the metal lines M1 and M2, and is electrically connected to the metal lines M1 and M2 in connection portions P11 and P12, respectively.

The common electrode CE2 overlaps the metal lines M4 and M5, and is electrically connected to the metal line M5 in a connection portion P15. In the example illustrated, the common electrode CE2 and the metal line M4 are not electrically connected to each other. The metal line M4 is electrically connected to the touch controller TC.

Figure 4:
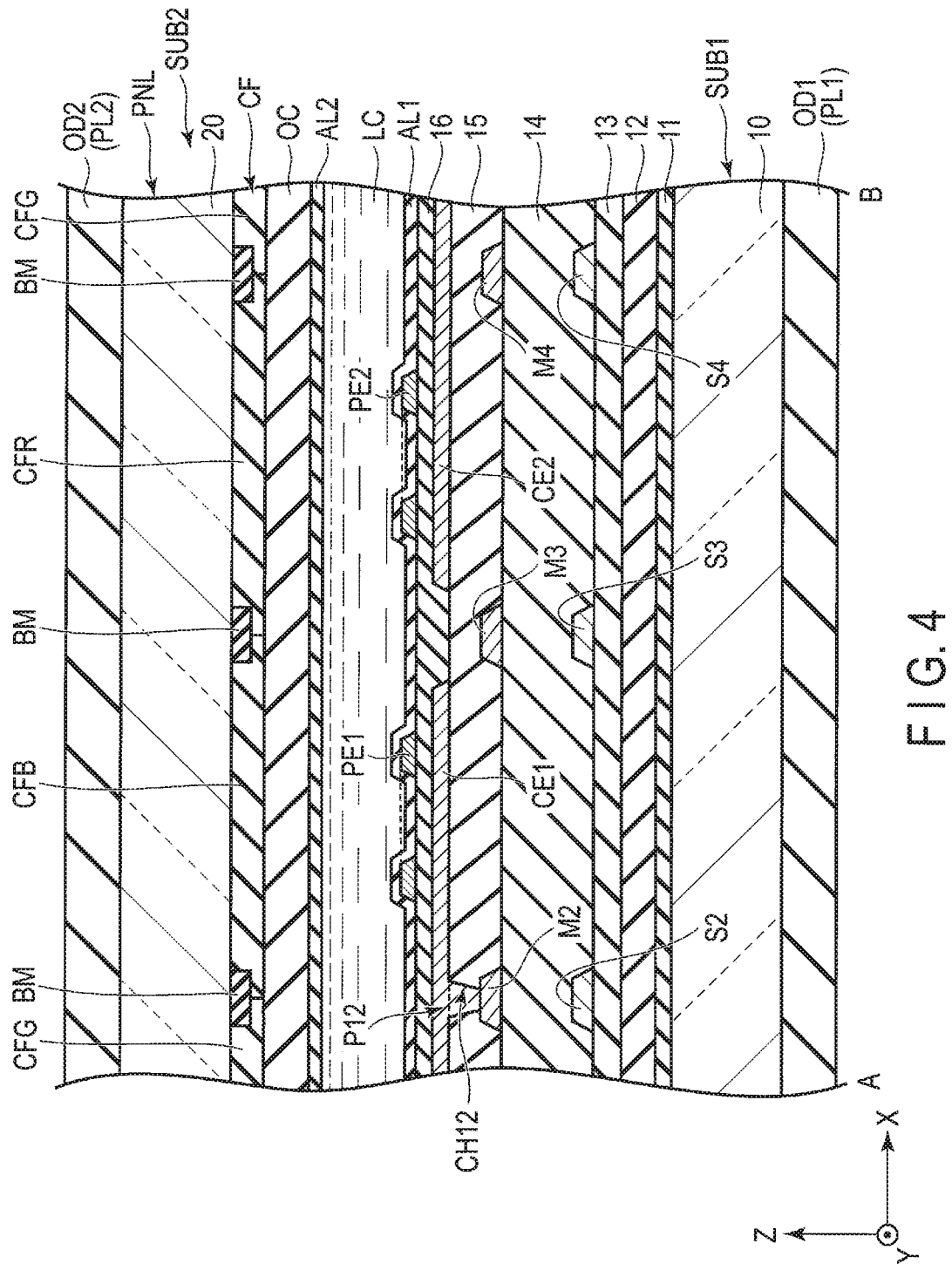
FIG. 4 is a cross-sectional view of a display panel PNL taken along line A-B shown in FIG. 3.

FIG. 4 is a cross-sectional view of the display panel PNL taken along line A-B shown in FIG. 3. The example illustrated corresponds to a case where a display mode using a lateral electric field is applied.

The first substrate SUB1 includes an insulating substrate 10, insulating films 11 to 16, the signal lines S2 to S4, the metal lines M2 to M4, the common electrodes CE1 and CE2, the pixel electrodes PE1 and PE2, an alignment film AL1, and the like. The insulating substrate 10 is a light transmissive substrate such as a glass substrate or a flexible resin substrate. The insulating films 11 to 13 are arranged in the third direction Z in this order on the insulating substrate 10. Although not shown in the drawing, a semiconductor layer provided in the switching element SW is located between the insulating films 11 and 12, and the scanning line G is located between the insulating films 12 and 13. The signal lines S2 to S4 are located between the insulating films 13 and 14. In one example, the signal lines S2 to S4 are formed of a layered product of titanium (Ti), aluminum (Al) and titanium (Ti) which are stacked one on top of another, but the signal lines S2 to S4 may be formed of other metal materials. The metal lines M2 to M4 are located between the insulating films 14 and 15. The metal lines M2 to M4 are located directly above the signal lines S2 to S4, respectively. In one example, the metal lines M2 to M4 are formed of a layered product of titanium (Ti), aluminum (Al) and titanium (Ti) which are stacked one on top of another or a layered product of molybdenum (Mo), aluminum (Al) and molybdenum (Mo) which are stacked one on top of another, but the metal lines M2 to M4 may be formed of other metal materials.

The common electrodes CE1 and CE2 are located between the insulating films 15 and 16. The insulating film 15 has a through hole CH12 corresponding to the connection portion P12. The common electrode CE1 is connected to the metal line M2 in the through hole CH12.

The pixel electrodes PE1 and PE2 are located on the insulating film 16 and are covered with the alignment film AL1. The pixel electrode PE1 is located directly above the common electrode CE1, and the pixel electrode PE2 is located directly above the common electrode CE2. Each of the common electrodes CE1 and CE2 and the pixel electrodes PE1 and PE2 is a transparent electrode formed of a transparent conductive material such as indium tin oxide (ITO) or indium zinc oxide (IZO).

Each of the insulating films 11 to 13 and the insulating film 16 is an inorganic insulating film of silicon oxide, silicon nitride, silicon oxynitride or the like, and may have a single layer structure or a multilayer structure. Each of the insulating films 14 and 15 is, for example, an organic insulating film such as acrylic resin. Note that the insulating film 15 may be an inorganic insulating film.

The second substrate SUB2 includes an insulating substrate 20, a light-shielding layer BM, a color filter layer CF, an overcoat layer OC, an alignment film AL2, and the like. The insulating substrate 20 is a light transmissive substrate such as a glass substrate or a resin substrate similarly to the insulating substrate 10. The light-shielding layer BM and the color filter layer CF are located on a side of the insulating substrate 20 which faces the first substrate SUB1. The color filter layer CF includes a red color filter CFR, a green color filter CFG and a blue color filter CFB. In the example illustrated, the color filter CFB is located directly above the pixel electrode PE1, and the color filter CFR is located directly above the pixel electrode PE2. The overcoat layer OC covers the color filter layer CF. The alignment film AL2 covers the overcoat layer OC. The alignment film AL1 and the alignment film AL2 are formed of, for example, a material exhibiting horizontal alignment properties.

The liquid crystal layer LC is located between the first substrate SUB1 and the second substrate SUB2 and is held between the alignment film AL1 and the alignment film AL2.

An optical element OD1 including a polarizer PL1 is bonded to the insulating substrate 10. An optical element OD2 including a polarizer PL2 is bonded to the insulating substrate 20.

Figure 5:
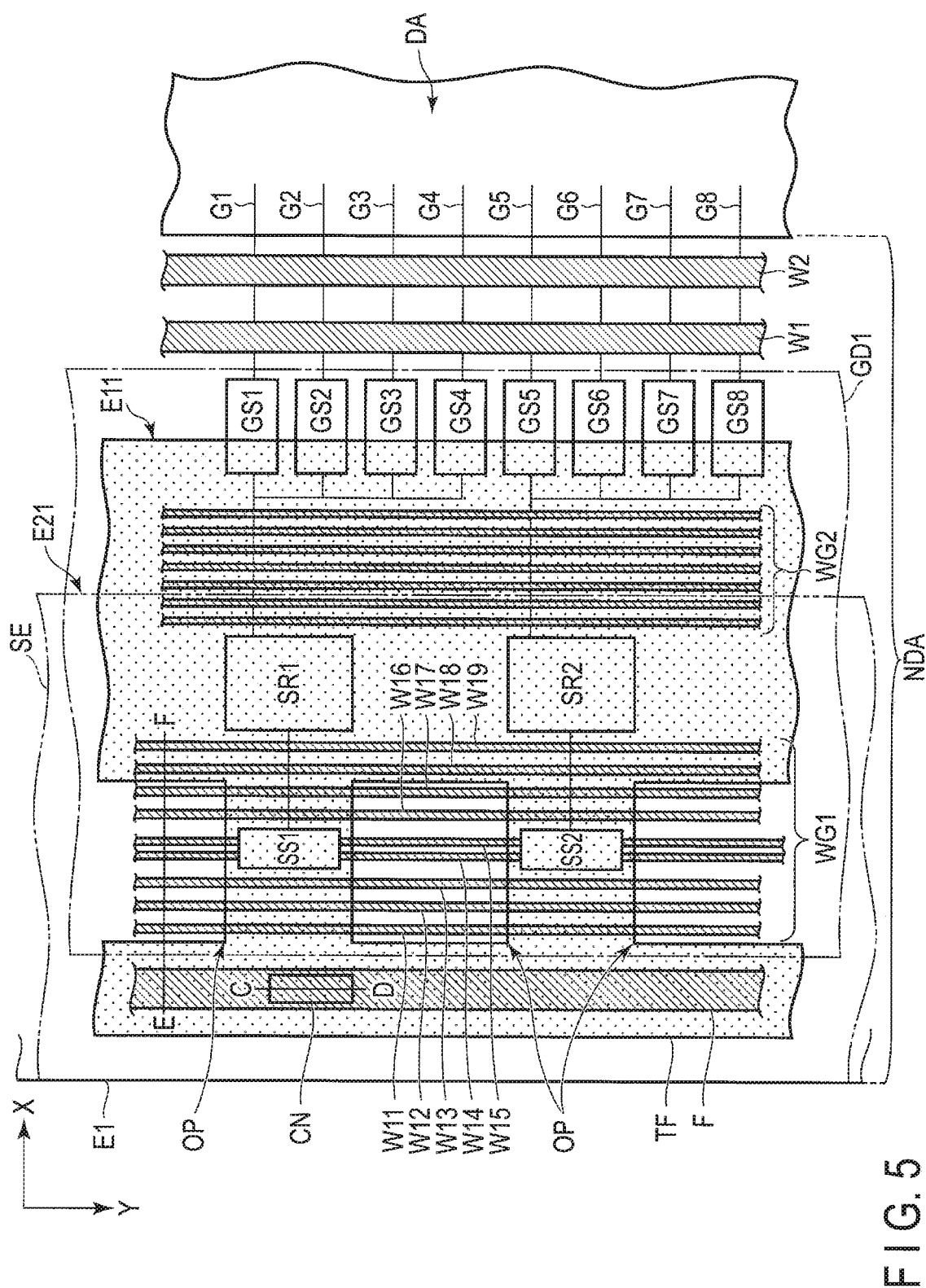
FIG. 5 is a plan view showing a configuration example of a non-display portion NDA including a scanning line drive circuit GD1.

FIG. 5 is a plan view showing a configuration example of the non-display portion NDA including the scanning line drive circuit GD1. Note that the non-display portion NDA including the scanning line drive circuit GD2 is configured similarly to the configuration example shown in FIG. 5.

As indicated by a dash-dot line in FIG. 5, the scanning line drive circuit GD1 includes scan direction switching circuits SS1 and SS2, shift registers SR1 and SR2, gate switches GS1 to GS8, and wiring line groups WG1 and WG2. The scan direction switching circuits SS1 and SS2 and the wiring line group WG1 are located between the feed line F and the shift registers SR1 and SR2 in the first direction X. The wiring line group WG2 is located between the shift registers SR1 and SR2 and the gate switches GS1 to GS8 in the first direction X. The gate switches GS1 to GS8 are located between the wiring line group WG2 and the wiring line W1 in the first direction X.

Although the configuration examples of the respective parts will be described later, an example of wiring lines W11 to W19 constituting the wiring line group WG1 will be briefly described below. The wiring line W11 is a wiring line for an output monitor (OUTV), and the wiring line W12 is a wiring line for supplying a vertical start pulse (STV). The wiring line W13 is a wiring line for supplying a clock which sets a scan direction to a forward direction (UP). The wiring lines W14 and W15 are wiring lines corresponding to internal nodes. The wiring line W16 is a wiring line for supplying a clock which sets a scan direction to a backward direction (xUP). The wiring line W17 is a wiring line for supplying a transfer clock (CKV). The wiring line W18 corresponds to a high-potential power supply line (VGH). The wiring line W19 corresponds to a low-potential power supply line (VGL).

Each of the wiring lines W13 and W16 is electrically connected to the scan direction switching circuits SS1 an SS2. The wiring lines W14 and W15 electrically connect the scan direction switching circuits SS1 and SS2 which are adjacent to each other in the second direction Y. Each of the wiring lines W17 to W19 is electrically connected to the shift registers SR1 and SR2. The shift register SR1 operates based on an output signal from the scan direction switching circuit SS1 and controls the gate switches GS1 to GS4. The gate switches GS1 to GS4 are electrically connected to the scanning lines G1 to G4 and supply scanning signals to the scanning lines G1 to G4, respectively. The shift register SR2 is configured similarly to the shift register SR1.

The wiring lines constituting the wiring line group WG2 include wiring lines connected to the gate switches GS and power supply lines. The gate switches GS1 to GS4 are provided with corresponding wiring lines of the wiring line group WG2, and these wiring lines supply gate voltages to the scanning lines G1 to G4, respectively.

A transparent conductive film TF is arranged so as to cover the feed line F and the scanning line drive circuit GD1. The transparent conductive film TF is electrically connected to the feed line F in a connection portion CN. That is, the potential of the transparent conductive film TF is a common potential similarly to the feed line F. In the present embodiment, the transparent conductive film TF does not cover the entire scanning line drive circuit GD1 and has a plurality of openings OP overlapping the scanning line drive circuit GD1. The openings OP are arranged in the second direction Y.

In the region overlapping the scanning line drive circuit GD1, the openings OP are formed in a region close to the feed line F or a region close to the substrate end portion E1 than the display portion DA. More specifically, the openings OP overlap the wiring line group WG1. In the present embodiment, the transparent conductive film TF covers the scan direction switching circuits SS1 and SS2, and in the region overlapping the wiring line group WG1, the opening OP is formed in a region between the scan direction switching circuits SS1 and SS2 which are adjacent to each other. Note that the transparent conductive film TF may not cover the scan direction switching circuits SS1 and SS2. In that case, openings OP will be formed also in portions overlapping the scan direction switching circuits SS1 and SS2, respectively, in the transparent conductive film TF located between the openings OP.

An end portion E11 on the display portion DA side of the transparent conductive film TF overlaps the gate switches GS1 to GS8. That is, the transparent conductive film TF covers parts of the gate switches GS1 to GS8 between the wiring line group WG2 and the wiring line W1. On the other hand, the end portion E11 of the transparent conductive film TF does not overlap the wiring lines W1 and W2. Note that, although not shown in the drawing, a transparent conductive film in a layer different from the transparent conductive film TF may overlap each of the wiring lines W1 and W2.

As indicated by a dash-dot-dot line in FIG. 5, the sealant SE overlaps the feed line F and a part of the transparent conductive film TF in a planar view. In addition, the sealant SE overlaps the openings OP in its central portion, and the end portions of the sealant SE do not overlap the openings OP. Furthermore, the sealant SE overlaps a part of the scanning line drive circuit GD1, that is, the wiring line group WG1, the scan direction switching circuits SS1 and SS2 and the shift registers SR1 and SR2. An end portion E21 on the display portion DA side of the sealant SE overlaps the wiring line group WG2. That is, the sealant SE covers a part of the wiring line group WG2 between the shift registers SR1 and SR2 and the wiring line W1. In addition, the end portion E11 of the transparent conductive film TF is located between the end portion E21 of the sealant SE and the display portion DA.

Figure 6:
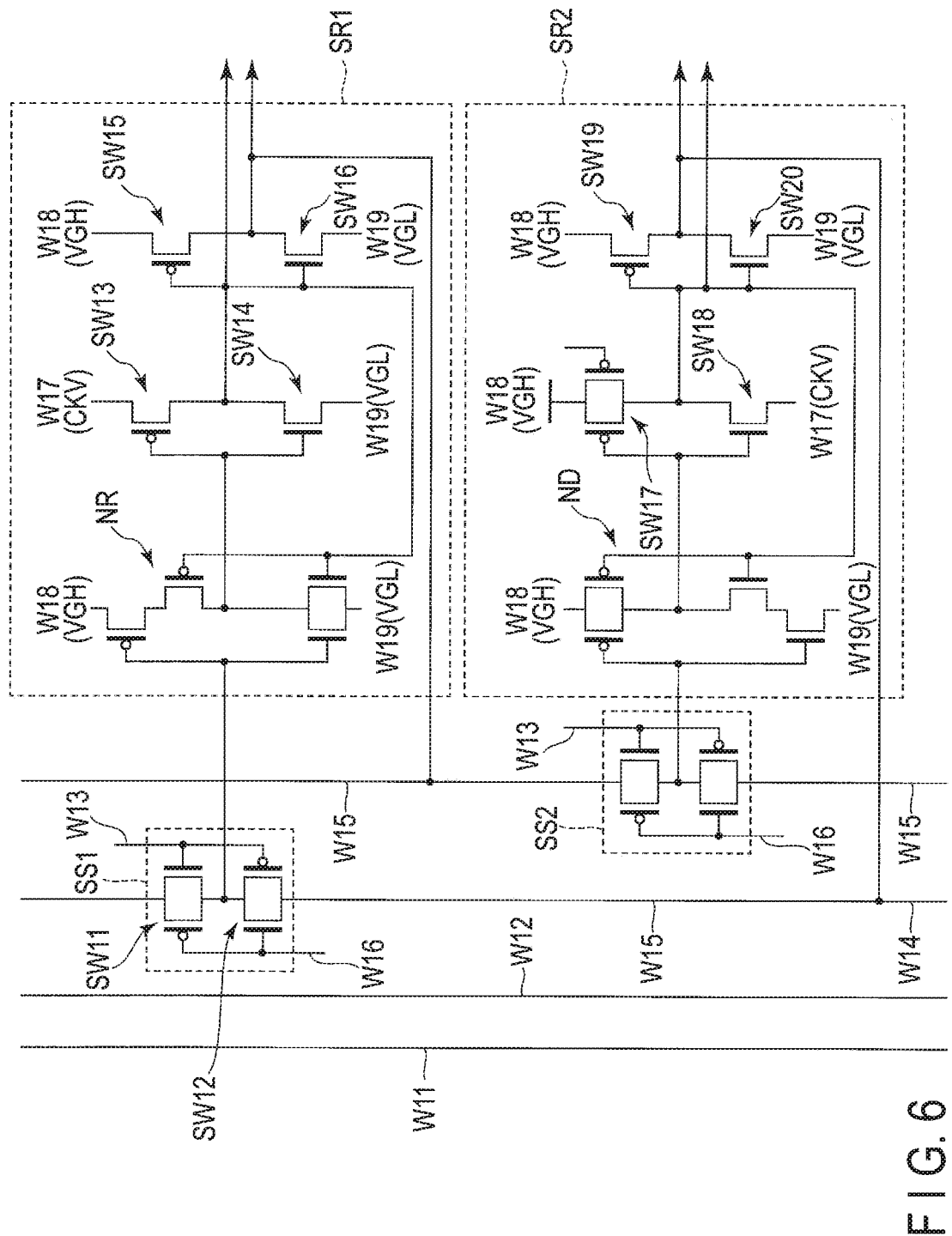
FIG. 6 is a circuit configuration example of a part of the scanning line drive circuit GD1 shown in FIG. 5.

FIG. 6 is a circuit configuration example of a part of the scanning line drive circuit GD1 shown in FIG. 5. The scan direction switching circuit SS1 includes switches SW11 and SW12. Each of the switches SW11 and SW12 is formed of a P-type transistor and an N-type transistor which are connected in parallel. The scan direction switching circuit SS2 is configured similarly to the scan direction switching circuit SS1.

The shift register SR1 includes a NOR circuit NR and switches SW13 to SW16. One end of the NOR circuit NR is connected to the wiring line W18 which is the high-potential power supply line (VGH), and the other end of the NOR circuit NR is connected to the wiring line W19 which is the low-potential power supply line (VGL). The switch SW13 which is a P-type transistor is connected in series to the switch SW14 which is an N-type transistor. The switch SW13 side is connected to the wiring line W17, and the switch SW14 side is connected to the wiring line W19. The switch SW15 which is a P-type transistor is connected in series to the switch SW16 which is an N-type transistor. The switch SW15 side is connected to the wiring line W18, and the switch SW16 side is connected to the wiring line W19.

The shift register SR2 includes a NAND circuit ND and switches SW17 to SW20. The switch SW17 is formed of two P-type transistors which are connected in parallel. The switch SW17 is connected in series to the switch SW18 which is an N-type transistor. The switch SW17 side is connected to the wiring line W18, and the switch SW18 side is connected to the wiring line W17. The switch SW19 which is a P-type transistor is connected in series to the switch SW20 which is an N-type transistor. The switch SW19 side is connected to the wiring line W18, and the switch SW20 side is connected to the wiring line W19.

Note that the circuit configuration of the scanning line drive circuit GD1 is not limited to the example illustrated.

Figure 7:
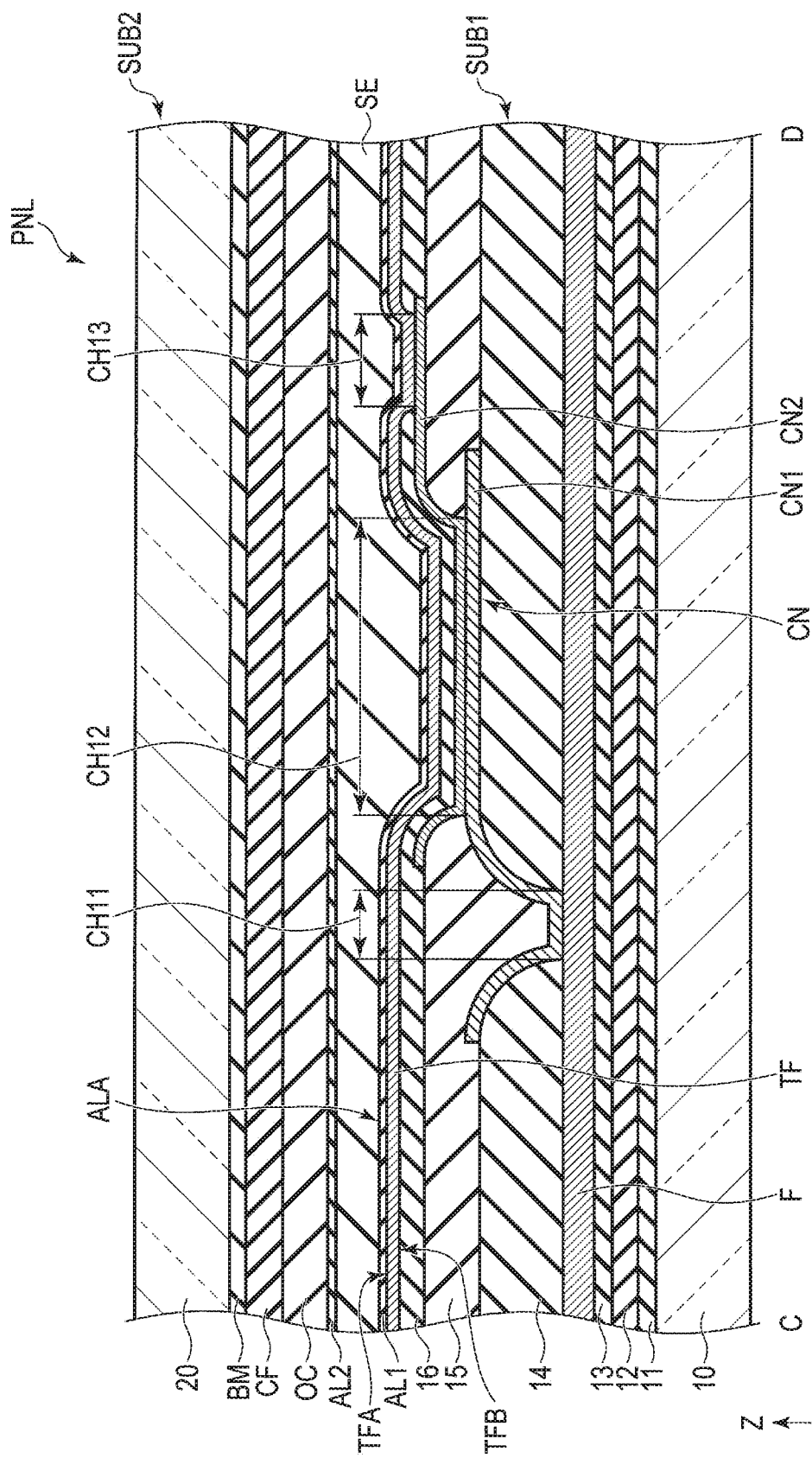
FIG. 7 is a cross-sectional view of the display panel PNL taken along line C-D including a connection portion CN shown in FIG. 5.

FIG. 7 is a cross-sectional view of the display panel PNL taken along line C-D including the connection portion CN shown in FIG. 5. Note that the optical elements OD1 and OD2 shown in FIG. 4 are not illustrated. In In the first substrate SUB1, the feed line F is located between the insulating films 13 and 14. The insulating film 14 has a through hole CH11 penetrating to the feed line F. A connection electrode CN1 is located between the insulating films 14 and 15 and is in contact with the feed line F in the through hole CH11. The insulating film 15 has the through hole CH12 penetrating to the connection electrode CN1. A connection electrode CN2 is located between the insulating films 15 and 16 and is in contact with the connection electrode CN1 in the through hole CH12. The insulating film 16 has a through hole CH13 penetrating to the connection electrode CN2. The transparent conductive film TF is located between the insulating film 16 and the alignment film AL1 and is in contact with the connection electrode CN2 in the through hole CH13.

In the example illustrated, the through holes CH11 to CH13 are deviated from one another in the second direction Y such that the through holes CH11 to CH13 will not overlap one another. That is, the insulating film 15 is arranged in the through hole CH11, and the insulating film 16 is arranged in the through hole CH12. Note that the through holes CH11 to CH13 may be arranged such that at least two of the through holes CH11 to CH13 will overlap each other.

The feed line F is a metal line located in the same layer as the signal line S2, etc., shown in FIG. 4 and formed of the same material as the signal line S2. The connection electrode CN1 is a metal electrode located in the same layer as the metal line M2, etc., and formed of the same material as the metal line M2. The connection electrode CN2 is a transparent electrode located in the same layer as the common electrode CE1, etc., and formed of the same material as the common electrode CE1. The transparent conductive film TF is located in the same layer as the pixel electrode PE1, etc., and is formed of the same material as the pixel electrode PE1.

The sealant SE is provided between the alignment films AL1 and AL2 and overlaps the connection portion CN. An upper surface ALA of the alignment film AL1 is in contact with the sealant SE. An upper surface TFA of the transparent conductive film TF is in contact with the alignment film AL1. A lower surface TFB of the transparent conductive film TF is in contact with the insulating film 16.

Figure 8:
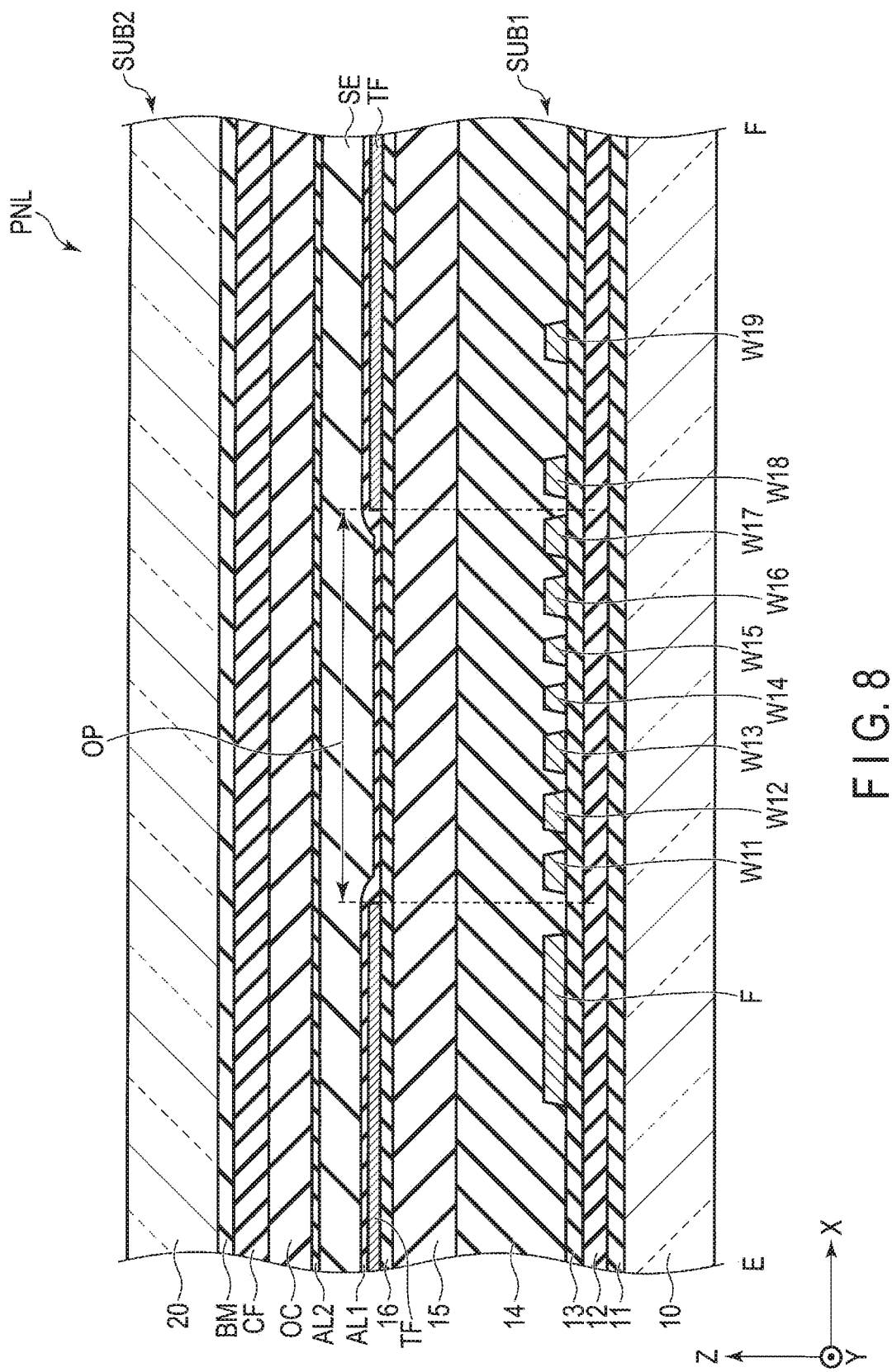
FIG. 8 is a cross-sectional view of the display panel PNL taken along line E-F including an opening OP shown in FIG. 5.

FIG. 8 is a cross-sectional view of the display panel PNL taken along line E-F including the opening OP shown in FIG. 5. Note that the optical elements OD1 and OD2 shown in FIG. 4 are not illustrated. In the example illustrated, the feed line F and the wiring lines W11 to W19 are located in the same layer and are located between the insulating films 13 and 14. The transparent conductive film TF is located directly above the feed line F and the wiring lines W18 and W19. The opening OP is formed directly above the wiring lines W11 to W17. In the opening OP, the alignment film AL1 is in contact with the insulating film 16.

Meanwhile, suppose that a voltage corresponding to a minimum grayscale value and a voltage corresponding to a maximum grayscale value are alternately applied to the signal lines S when a specific pattern such as a checker pattern is displayed in the display portion DA. At this time, the metal line M (and the common electrode CE electrically connected to the metal line M) overlapping the signal line S is capacitively coupled to the signal line S. Therefore, when the fluctuation of the potential of the signal line S is large, the fluctuation of the potential of the common electrode CE is large. The potential fluctuation of the common electrode CE is transferred to the feed line F via the IC chip 1 which is the supply source of the common potential, and may cause malfunction of the scanning line drive circuits GD1 and GD2 which the feed line F overlaps. In particular, the wiring line which supplies the clock or start pulse of the wiring line group WG1 is more vulnerable to the influence of malfunction than the power supply line of the wiring line group WG1 and the wiring line group GW2.

According to the present embodiment, the transparent conductive film TF electrically connected to the feed line F has the openings OP overlapping the scanning line drive circuits GD1 and GD2. Therefore, even if the potential fluctuation of the common electrode CE is transferred to the feed line F, the influence can be reduced. Consequently, malfunction of the scanning line drive circuits GD1 and GD2 can be suppressed, and reduction in reliability can be suppressed.

In addition, the openings OP overlap the wiring line group WG1, and parasitic capacitance can be reduced. Furthermore, the transparent conductive film TF overlaps the circuit portions (the scan direction switching circuits SS1 and SS2 and the shift registers SR1 and SR2) of the scanning line drive circuit GD1 and the high-potential power supply line W18, and blocks an electric field from the circuit portions to the liquid crystal layer LC.

Furthermore, in the region overlapping the sealant SE, the transparent conductive film TF is firmly bonded to the alignment film AL1 and the insulating film 16 on both the substrate end portion E1 side and the display portion DA side across the opening OP. For this reason, interlayer peeling in the region overlapping the sealant SE can be suppressed.

In the present embodiment, the shift register SR1 corresponds to the first shift register, and the shift register SR2 corresponds to the second shift register. The scan direction switching circuit SS1 corresponds to the first scan direction switching circuit, and the scan direction switching circuit S22 corresponds to the second scan direction switching circuit. The wiring line group WG1 corresponds to the first wiring line group, and the wiring line group WG2 corresponds to the second wiring line group.

The end portion E11 of the transparent conductive film TF corresponds to the first end portion, and the end portion E21 of the sealant SE corresponds to the second end portion. The insulating film 14 corresponds to the first insulating film, and the through hole CH11 corresponds to the first through hole. The insulating film 15 corresponds to the second insulating film, and the through hole CH12 corresponds to the second through hole. The insulating film 16 corresponds to the third insulating film, and the through hole CH13 corresponds to the third through hole. The connection electrode CN1 corresponds to the first connection electrode, and the connection electrode CN2 corresponds to the second connection electrode.

As described above, according to the present embodiment, a display device which can suppress reduction in reliability can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate;
   a second substrate facing the first substrate;
   a liquid crystal layer located between the first substrate and the second substrate;
   a sealant bonding the first substrate and the second substrate together and sealing in the liquid crystal layer;
   a display portion of the first substrate in which a plurality of pixels are arranged in a matrix in a first direction and a second direction;
   a non-display portion of the first substrate around the display portion;
   a scanning line located in the display portion and extending in the first direction;
   a feed line at a common potential located in the non-display portion and extending in the second direction;
   a scanning line drive circuit located in the non-display portion and supplying a scanning signal to the scanning line;
   a first wiring line group located between the feed line and the scanning line drive circuit and connected to the scanning line drive circuit; and
   a transparent conductive film electrically connected to the feed line and covering the feed line, the first wiring line group and the scanning line drive circuit, wherein
   the transparent conductive film has an opening overlapping the first wiring line group,
   the sealant is located in the non-display portion and overlaps the opening of the transparent conductive film, the opening is formed in a region close to the feed line of a region overlapping the first wiring line group, the feed line is located between a substrate end portion of the first substrate and the scanning line drive circuit, and the scanning line drive circuit is located between the feed line and the display portion.

2. The display device of claim 1, wherein the scanning line drive circuit comprises a shift register, a gate switch, and a scan direction switching circuit, the first wiring line group and the scan direction switching circuit are located between the feed line and the shift register in the first direction, and the transparent conductive film overlaps the scan direction switching circuit.

3. The display device of claim 2, further comprising a second wiring line group located between the shift register and the gate switch in the first direction and connected to the scanning line drive circuit, wherein the opening does not overlap the second wiring line group.

4. The display device of claim 2, wherein the transparent conductive film has a first end portion on a display portion side thereof, and the first end portion overlaps the gate switch.

5. The display device of claim 2, further comprising a wiring line located between the gate switch and the display portion in the first direction and extending in the second direction, wherein a potential of the wiring line is a fixed potential lower than a potential of the transparent conductive film, and the transparent conductive film does not overlap the wiring line.

6. The display device of claim 2, wherein the sealant overlaps the feed line, the first wiring line group and the shift register but does not overlap the gate switch in a planar view.

7. The display device of claim 4, wherein the sealant has a second end portion on a display portion side thereof, and the first end portion is located between the second end portion and the display portion.

8. The display device of claim 1, wherein the scanning line drive circuit comprises a first shift register, a second shift register, a first scan direction switching circuit located between the feed line and the first shift register in the first direction, and a second scan direction switching circuit located between the feed line and the second shift register in the first direction, and the opening is formed between the first scan direction switching circuit and the second scan direction switching circuit in the second direction.

9. A display device comprising:

a first substrate;

a second substrate facing the first substrate;

a liquid crystal layer located between the first substrate and the second substrate;

a sealant bonding the first substrate and the second substrate together and sealing in the liquid crystal layer;

a display portion of the first substrate in which a plurality of pixels are arranged in a matrix in a first direction and a second direction;

a non-display portion of the first substrate around the display portion;

a scanning line located in the display portion and extending in the first direction;

a feed line at a common potential located in the non-display portion and extending in the second direction;

a scanning line drive circuit located in the non-display portion and supplying a scanning signal to the scanning line;

a first wiring line group located between the feed line and the scanning line drive circuit and connected to the scanning line drive circuit; and a transparent conductive film electrically connected to the feed line and covering the feed line, the first wiring line group and the scanning line drive circuit, wherein the transparent conductive film has an opening overlapping the first wiring line group, the sealant is located in the non-display portion and overlaps the opening of the transparent conductive film, the feed line is located between a substrate end portion of the first substrate and the scanning line drive circuit, the scanning line drive circuit is located between the feed line and the display portion, the first substrate further comprises a first insulating film, a second insulating film, a third insulating film, a first connection electrode which is in contact with the feed line in a first through hole of the first insulating film, and a second connection electrode which is in contact with the first connection electrode in a second through hole of the second insulating film in the non-display portion, and the transparent conductive film is in contact with the second connection electrode in a third through hole of the third insulating film.

10. The display device of claim 9, wherein the first insulating film and the second insulating film are organic insulating films, the first connection electrode is a metal electrode, and the second connection electrode is a transparent electrode.

11. The display device of claim 9, wherein the first substrate further comprises an alignment film, an upper surface of the alignment film is in contact with the sealant, an upper surface of the transparent conductive film is in contact with the alignment film, and a lower surface of the transparent conductive film is in contact with the third insulating film.

12. The display device of claim 9, wherein the first substrate further comprises a signal line, a metal line overlapping the signal line, a common electrode and a pixel electrode in the display portion, the metal line is located between the first insulating film and the second insulating film and is formed of a same material as the first connection electrode, the common electrode is located between the second insulating film and the third insulating film and is formed of a same material as the second connection electrode, and the pixel electrode is located between the third insulating film and the liquid crystal layer and is formed of a same material as the transparent conductive film.

13. The display device of claim 12, wherein the feed line and the first wiring line group are covered with the first insulating film and are formed of a same material as the signal line.

14. The display device of claim 11, wherein the alignment film is in contact with the third insulating film in the opening.

15. The display device of claim 9, wherein the first through hole, the second through hole and the third through hole are deviated from one another.

16. The display device of claim 1, wherein the transparent conductive film has a plurality of openings including the opening, and the openings are arranged in a direction in which the first wiring line group extends.

\* \* \* \* \*